US006639012B2

(12) United States Patent
Wills et al.

(10) Patent No.: US 6,639,012 B2
(45) Date of Patent: Oct. 28, 2003

(54) HIGH RUBBER IMPACT MODIFIER POWDERS

(75) Inventors: Morris Christopher Wills, Philadelphia, PA (US); Chuen-Shyong Chou, Ambler, PA (US); Karen Casey, Harleysville, PA (US); Joseph Robert Adamo, Souderton, PA (US); Fanwen Zeng, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/981,348

(22) Filed: Oct. 17, 2001

(65) Prior Publication Data

US 2002/0072566 A1 Jun. 13, 2002

Related U.S. Application Data

(60) Provisional application No. 60/243,488, filed on Oct. 25, 2000.

(51) Int. Cl.$^7$ ............................................... C08L 51/04
(52) U.S. Cl. ........................... 525/64; 525/69; 525/228; 525/310
(58) Field of Search ............................. 525/64, 69, 228, 525/310

(56) References Cited

U.S. PATENT DOCUMENTS

| | | | |
|---|---|---|---|
| 3,793,402 A | 2/1974 | Owens | |
| 3,833,686 A | 9/1974 | Grochowski et al. | |
| 3,971,835 A | 7/1976 | Myers et al. | |
| 4,278,576 A | 7/1981 | Goldman | |
| 4,419,492 A | 12/1983 | Simon | |
| 4,495,324 A | * 1/1985 | Chacko et al. | 524/504 |
| 4,581,408 A | 4/1986 | Trabert et al. | |
| 5,264,492 A | 11/1993 | Demirors | |
| 5,534,594 A | 7/1996 | Troy et al. | |
| 5,599,854 A | 2/1997 | Troy et al. | |
| 5,719,232 A | 2/1998 | Schmidt et al. | |
| 6,054,531 A | * 4/2000 | Craig | |

FOREIGN PATENT DOCUMENTS

| | | |
|---|---|---|
| EP | 0 190 884 | 4/1990 |
| EP | 0 279 724 B1 | 4/1993 |
| EP | 0 418 042 B1 | 2/1994 |
| EP | 0 522 791 B1 | 3/1996 |
| EP | 0 620 236 B1 | 1/1998 |
| WO | WO 99/09080 * | 2/1999 |
| WO | WO 99/09081 * | 2/1999 |

OTHER PUBLICATIONS

European Equivalent for US patent application No. 09/981,348 EP 1 201 701 A2, which contains search report, Feb. 5, 2002.

* cited by examiner

Primary Examiner—James J. Seidleck
Assistant Examiner—Olga Asinovsky

(57) ABSTRACT

A powdery high rubber impact modifier composition containing two or more populations of polymer particles having a total rubbery weight fraction of greater than 90 weight percent is provided. Aqueous polymer particle dispersions for preparing these high rubber impact modifiers which can be spray dried to a powder are also provided. Also provided are polymeric compositions having a matrix resin component and the powdery high-rubber impact modifiers.

17 Claims, No Drawings

HIGH RUBBER IMPACT MODIFIER POWDERS

CROSS REFERENCE TO RELATED PATENT APPLICATIONS

This application claims the benefit of the filing date of U.S. provisional application Ser. No. 60/243,488, filed Oct. 25, 2000.

BACKGROUND OF THE INVENTION

This invention relates to powdery compositions having a high rubber content which are useful as impact modifiers. This invention also relates to plastics additive polymer particle dispersions having a high rubber content which can be spray dried into a powder form. This invention further relates to a process for preparing powdery compositions having a high rubber content which are useful as impact modifiers. This invention even further relates to polymeric compositions that include a polymeric component and one or more high rubber impact modifier compositions.

Numerous molded articles and films are manufactured from one or more of a variety of polymeric resins. Often times, these resins by themselves are brittle and do not possess suitable impact strength required by the end use for which they are made. To overcome their shortcomings, these resins, especially poly(vinyl chloride), are generally blended with plastics additives which improve impact strength. Such plastics additives are typically known in the industry as impact modifiers and are typically supplied in a powder form.

Many impact modifiers which are useful in many resins are based on core-shell polymer particle compositions. These core-shell polymer particles typically contain a soft rubbery polymer phase (e.g., core) surrounded by a hard polymer phase (e.g., shell). The weight ratio of the rubbery phase to the hard phase is usually as high as possible to make the impact modifier as efficient as possible at improving the impact strength of the thermoplastic. However, when the weight percentage of the rubber phase exceeds 90 weight percent ("high rubber") based on the weight of the total core-shell polymer particle, it has previously been unrealizable to isolate such high rubber content particles as a free-flowing powder at practical isolation rates.

Spray drying is an economical, safe and desirable means of isolating dispersions of core-shell polymer particles as free-flowing powders. During this process an aqueous dispersion of core-shell polymer particles is atomized in a chamber containing heated air, water is removed, and the core-shell polymer particles are aggregated into dry powder particles. Unfortunately, there are several problems associated with spray drying polymer particle dispersions containing a high rubbery phase content above 90 weight percent. These problems include: (1) sticking of the particles to the chamber walls of the spray dryer; (2) bridging of the particles over conveying lines entrances; and (3) unacceptable powder flow characterized by aggregation, clumping, and flow interruptions.

One of the methods of solving this problem as been suggested in U.S. Pat. No. 4,278,576. In this Patent, Goldman combines stearate coated calcium carbonate particles ("flow aid") with high rubber impact modifier particles before or during the spray-drying step to provide free flowing impact modifier powders. While Goldman exemplifies an 88 weight percent rubber-content impact modifier powder can be provided by co-spray drying with 7 weight percent by weight of flow aid, there are many advantages associated with increasing the rubber content and reducing the flow aid content. For example, one advantage of having a powdery impact modifier which has a rubbery content greater than 90 weight percent is its improved effectiveness to increase the impact strength of matrix resins. As well, it is also advantageous to eliminate or reduce the required flow aid to less than 7 weight percent to further improve both the impact modifier's effectiveness as well as its economic efficiency.

The problem addressed by the invention is to provide high rubber impact modifier powder compositions in which the weight fraction of the rubbery phase is greater than 90 weight percent. We have now found that high rubber impact can be readily spray dried to a powder when the impact modifiers contain core-shell polymer particles which are provided as two or more populations of polymer particles wherein the mean particle diameters of the two populations vary by at least 50 percent. We have also suprisingly found that these new high rubber core-shell polymer impact modifiers do not necessarily require any flow aid to provide a spray-dried powder compared to similar core-shell polymers having a single population of particles. We have further suprisingly found that these high rubber core-shell polymer impact modifiers require less flow aid to provide compaction-free powders compared to similar core-shell polymers having a single population of particles.

STATEMENT OF THE INVENTION

Accordingly, one object of the present invention is to provide a powdery impact modifier composition, comprising:

(a) a first population of polymer particles, (b) a second population of polymer particles, and wherein the mean particle diameter of the first population of polymer particles is at least 50 percent larger than the mean particle diameter of the second population of particles, and wherein the total rubbery weight fraction of the first and second populations of polymer particles is greater than 90 weight percent.

Another object of the present invention is to provide an aqueous polymer particle dispersion which can be spray dried to a powder, wherein the total rubbery weight fraction of the polymer particles in the dispersion is greater than 90 weight percent.

Yet another object of the present invention is to provide a process for preparing a powdery impact modifier composition, comprising the steps of:

(I) providing a polymer particle dispersion, said dispersion comprising:

(a) a first population of polymer particles, and (b) a second population of polymer particles, wherein the mean particle diameter of the first population of polymer particles is at least 50 percent larger than the mean particle diameter of the second population of particles, and wherein the total rubbery weight fraction of the first and second populations of polymer particles is greater than 90 weight percent, and (II) spray-drying the polymer particle dispersion.

A further object of the present invention is to provide a polymeric composition, comprising:

(a) a matrix resin component, and (b) an impact modifier, the impact modifier comprising, (i) a first population of polymer particles, and (ii) a second population of polymer particles, wherein the mean particle diameter of the first population of polymer particles is at least 50 percent larger than the mean particle diameter of the second population of particles, and wherein the total rubbery weight fraction of the first and second populations of polymer particles is greater than 90 weight percent.

These and other objects, as will become apparent from the following disclosure, are achieved by the various embodiments of the present invention set out below.

DETAILED DESCRIPTION OF THE INVENTION

The term "rubbery" used herein denotes the thermodynamic state of a polymer above its glass transition temperature.

The term "units derived from" used herein refers to polymer molecules that are synthesized according to known polymerization techniques wherein a polymer contains "units derived from" its constituent monomers.

The term "molecular weight" used herein refers to the weight average molecular weight of polymer molecules as determined by the gel permeation chromatography method.

The term "graftlinker" used herein refers to multifunctional monomers capable of forming multiple covalent bonds between polymer molecules of one type with polymer molecules of another type.

The term "crosslinker" used herein refers to multifunctional monomers capable of forming multiple covalent bonds between polymer molecules of the same type.

The term "alkyl (meth)acrylate" used herein refers to both alkyl acrylate and alkyl methacrylate monomer compounds.

The term "resin" used herein refers to both thermoplastic resin and thermosetting resins.

The term "stage" used herein is intended to encompass its broadest possible meaning, including the meaning conveyed in prior art such as in U.S. Pat. No. 3,793,402; U.S. Pat. No. 3,971,835; U.S. Pat. No. 5,534,594; and U.S. Pat. No. 5,599,854; which offer various means for achieving "staged" polymers.

The term "parts" used herein is intended to mean "parts by weight". Unless otherwise stated, "total parts by weight" do not necessarily add to 100.

The term "weight percent" used herein is intended to mean "parts per hundred by weight" wherein the total parts add to 100.

The term "weight fraction" used herein is synonymous with "weight percentage", when it is evident that the total parts described add to 100.

The term "solids weight fraction" used herein is intended to mean the weight percentage of the dried residue based on the total weight of an aqueous particle dispersion that is dried to constant weight.

The term "high rubber" used herein refers to a composition having more than 90 weight percent of one or more rubbery components.

The term "particle size" used herein refers to the mean particle diameter of a population of particles.

The term "mode" used herein refers to a particular population of particles as in "large mode" and "small mode".

The term "core-shell" used herein refers to polymer particles which typically have at least one outer polymer phase externally situated adjacent to an inner polymer phase; the outer phase may be situated as a single phase (shell) or as multiple phases (islands) on the inner polymer phase (core).

The use of the term "first population" and "second population" as used herein is merely used for the sake of convenience in identifying two different populations of polymer particles and has no connotation relating to process order.

As used herein, the term "compaction-free" refers to powdery compositions which are not compactable into a single mass by manually squeezing a handful of the powdery composition.

As used herein, the term "compositional" refers to chemical composition.

All ranges defined herein are inclusive and combinable.

The Fox Equation as used herein is:

$$1/Tg = a/Tg(A) + b/Tg(B) + c/Tg(C) + \ldots \quad \text{[EQUATION 1]}$$

wherein a, b, c, etc. refer to the weight fraction of monomeric components A, B, C, etc. respectively, and Tg(A), Tg(B), Tg(C), etc. refer to the glass transitions for the homopolymers derived from monomers A, B, C, etc., expressed in degrees Kelvin. These glass transition temperatures are defined according to the results obtained using differential scanning calorimetry (DSC) in the high molecular weight limit.

Temperature in degrees Celsius (C.) equals temperature in degrees Kelvin (K) plus 273.15.

As will be set out below, the embodiments of this invention pertain to various aspects of a powdery impact core-shell impact modifier that includes a first and second population of polymer particles having a total rubber content of greater than 90 weight percent, methods of making such impact modifiers, and plastic compositions that include such impact modifiers.

Among other things, this invention resolves at least some of the problems associated with preparing core-shell impact modifier powders having a total rubber content of greater than 90 weight percent. This is accomplished by the development of novel impact modifiers that include at least two populations of polymer particles that vary in mean particle diameter by at least 50 percent and have a rubbery content of greater than 90 weight percent. The novel impact modifiers can be spray dried to a powder. Optionally, the novel impact modifiers are spray dried with a suitable flow aid to provide compaction-free powders.

In one embodiment of the present invention, there is provided a novel powdery impact modifier composition which includes a first population of polymer particles, a second population of polymer particles. In this embodiment, the total rubbery weight fraction of the first and second populations of polymer particles is greater than 90 weight percent. In this embodiment, the mean particle diameter of the first population of polymer particles is at least 50 percent larger than the mean particle diameter of the second population of particles.

In another embodiment of the present invention, there is provided a novel spray-driable polymer particle dispersion which includes water and polymer particles, wherein the polymer particles include at least a first population of polymer particles, and a second population of polymer particles, wherein the total rubbery weight fraction of the first and second populations of polymer particles is greater than 90 weight percent. In this embodiment, the mean particle diameter of the first population of polymer particles is at least 50 percent larger than the mean particle diameter of the second population of particles. In this embodiment, the size differences among the first and second populations afford the following advantages over comparable single population impact modifiers: improved powder flow properties (less compaction), possibility of high solids (improved process efficiency), low water content (for advantages in subsequent water removal step), and/or lower in-process viscosity (for improved spray-drying).

In yet another embodiment of the present invention there is provided a process for preparing a powdery impact modifier composition wherein the total rubbery weight fraction of the core-shell polymer particles of the composition is greater than 90 weight percent. The process encompassed by this embodiment includes at least the following steps. First, a polymer particle dispersion is provided which includes a first population of polymer particles and a second population of polymer particles. Then, the polymer particle dispersion is spray-dried. In this embodiment, the mean particle diameter of the first population of polymer particles is at least 50 percent larger than the mean particle diameter of the second population of particles, while the total rubbery weight fraction of the first and second populations of polymer particles is greater than 90 weight percent.

In a further embodiment of the present invention, there is provided a novel polymeric composition which includes a matrix resin component and a core-shell impact modifier, wherein the total rubbery weight fraction of the core-shell polymer particles of the impact modifier is greater than 90 weight percent. In this embodiment, the polymer particles include a first population of polymer particles, and a second population of polymer particles, wherein the mean particle diameter of the first population of polymer particles is at least 50 percent larger than the mean particle diameter of the second population of particles. In this case, the size differences among the first and second populations of particles afford the following specific advantages over single population particles: improved impact properties are observed wherein larger populations of small particles can be provided without the associated dust problems; typically, small particles tend to impart better impact modifying and processing properties to polymeric resins.

In these embodiments of the present invention, the spray-driable polymer particle dispersions are optionally spray dried with a flow aid to make compaction-free powders.

Various means can be used to produce the spray-driable polymer particle dispersions of the present invention which contain core-shell polymer particles containing more than 90 weight percent rubbery component. One example of a suitable means for providing such high rubber spray-driable dispersions is to employ as part of the polymer particles at least two differently-sized populations of polymer particles when the particle size of one ("first") population of particles is at least 50 percent larger than that of the other ("second") population of particles. In instances where even higher rubber contents are desirable, the particle size of the first population of particles is at least 100 percent larger than that of the second; more typically at least 200 percent larger than that of the second population; and even more typically at least 250 percent larger than that of the second population.

However, it has also been observed that having the particle size difference too great can cause some problems. Accordingly, when practicing this invention, the particle size of the first population of particles is typically not greater than 10,000 percent larger than that of the second population of particles; more typically not greater than 1,000 percent larger than that of the second population; and even more typically not greater than 300 percent larger than that of the second population. These size differences are particularly preferred for preparing core-shell polymer particles which are useful as impact modifiers. For the purposes of creating a high rubber spray-driable polymer particle dispersion that flows well, in one preferred embodiment the particle size difference is in the range of from 700 percent to 1,000 percent.

Although the present invention does not require a particular solids weight fraction of the dispersion, it has been observed that there are certain process and economical advantages associated with having a polymer concentration greater than 25 weight percent. Accordingly, when practicing this invention, the solids weight fraction of the dispersion is typically at least 25 weight percent; more typically at least 40 weight percent; and even more typically, at least 50 weight percent. As well, the solids weight fraction is typically no more than 75 weight percent, and more typically no more than 65 weight percent.

Combinations of two polymer populations which vary in particle size are describable using three main variables: weight percent of large population "mode", particle size of the large mode, and particle size of small mode. Diameter Ratio (DR) is equal to the diameter of the large mode (Dlarge) divided by the diameter of the smaller mode (Dsmall). From a theoretical standpoint the optimum value of DR for maximizing packing density ranges from 7 to 10.

In comparison to randomly packed ideal single mode spheres which has a packing factor of 0.639, a combination of large mode and small mode spheres having a DR of 10 provides a packing factor of 0.835, while a DR of infinity will give 0.870. Hence, any further increase in the DR above 10 gives a marginal increase in packing density.

To achieve the maximum packing factor for a combination of large mode and small mode polymer particles, the weight percent of the large polymer particles should be 73.5 percent. While this value is for an ideal system for merely maximizing the packing effects, the weight percent of the large polymer particles may vary depending on properties sought by the polymer particles. For example, impact modifiers tend to provide better impact strength to polymeric resins as the particle size decreases, thus the weight percent of large impact modifier polymer particles may be best less than 73.5 percent.

In addition, a combination of three or more populations of polymer particles "multi-populations" which varying in particle size can provide further increases in the packing fraction beyond the theoretical value of 87 percent for two populations of polymer particles. Further increases are expected in "multi-populations" of polymer particles as the interstitial spaces in the two-population system can be further filled by even smaller particles.

In providing powdery impact modifiers of the present invention by spray drying polymer particle dispersions, it is desirable that the viscosity of polymer particle dispersion should be no more than 2000 centipoise, typically no more than 1750 centipoise, more typically no more than 1500 centipoise, and even more typically no more than 1250 centipoise. These viscosities are provided using a Brookfield viscometer with a #3 spindle operating at 30 RPM. Polymer particle dispersions which have viscosities greater than 2000 centipoise can be suitably diluted, such as by addition of an aqueous liquid, to reduce the viscosity to 2000 centipoise or less. As well, surfactants may also be added to these polymer particle dispersions to improve their shear stability. Accordingly, using two polymer particle populations that differ by 50 percent in mean particle size provideds a much lower viscosity than a single population of comparable polymer particles. Hence, polymer dispersions of the present invention have lower viscosities than comparable single population particles and are more readily spray driable at higher polymer particle weight fractions.

In the present invention, the larger-sized polymer particle population typically has a mean particle diameter in the range from 10 nm to 5,000 nm. More typically, the larger-sized population has a mean particle diameter in the range from 50 nm to 1,500 nm; even more typically from 100 nm to 1,000 nm; and even more typically from 300 nm to 600 nm.

For providing additives useful as impact modifiers, it is desirable that the mean particle diameter of the smaller population has a particle size of 100–150 nm. Maximizing the weight fraction of the smaller population is desirable for improving impact strength. Often, the mean particle diameter of impact modifier particles of the small mode is most desirably in the range of from 100 to 120 nm, especially where the particle solids concentration is no more than 50 percent. At higher weight percent solids of 65 percent, it is desirable that the mean particle diameter of the smaller population is in the range of 225 to 275 nm. Accordingly, the larger population at 50 percent solids is most desirably in the range of 300 nm to 350 nm. At concentrations of 65 percent, the larger population has a mean particle diameter most typically in the range of from 500 to 600 nm.

Optionally, the impact modifiers of the present invention may contain polymer particles which are useful as processing aids. Typically, processing aids have polymer compositions exhibiting a glass transition ("Tg") higher than 25° C. Typically, processing aids have polymer compositions with molecular weights ("MW") greater than 1 million g/mol. More typically, processing aids have molecular weights greater than 3 million g/mol. In certain applications, such as preparing PVC foam, processing aids may have molecular weights greater than 6 million.

Optionally, the impact modifiers of the present invention may also include other plastics additives, including: waxes; pigments; opacifiers; fillers; exfoliated clays; toners; anti-static agents; metals; flame retardants; thermal stabilizers; co-stabilizers; antioxidants; cellulosic materials; other impact modifiers; processing aids; lubricating processing aids; internal lubricants; external lubricants; oils; rheology modifiers; powder flow aids; melt-flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; colorants; and combinations thereof. These optional plastics additives can be subsequently added to the spray dried powders of the present invention by various powder processes such as: powder post-blending; co-spray drying; and co-agglomeration.

Also as used herein, the term "dimensionally" refers to the particles' size and/or shape. With regard to their shape, the particles making-up the impact modifier's core-shell polymer particles are typically spherically-shaped. However, they can have any suitable shape. Various shapes of core-shell polymer particles can be prepared by processes known in the art of polymer particle technology. Examples of such suitable shapes of particles include: rubbery core/hard shell inhomogeneous particles, hard shell/rubbery core particles, particles having more complex (e.g. three-stage, soft/soft/hard, soft/hard/soft, hard/soft/hard; four-stage soft/hard/soft/hard, etc.) morphologies; ellipsoidal particles having an aspect ratio greater than 1:1; raspberry-shaped particles; multi-lobe-shaped particles; dumbbell-shaped particles; agglomerated particles; bilobal particles; hollow sphere particles.

Accordingly, when practicing this invention, the weight percentage of rubbery component of the core-shell polymer particles is greater than 90 weight percent; typically at least 92 weight percent; more typically at least 93 weight percent; and even more typically at least 94 weight percent. Accordingly, the weight percentage of rubbery component of the core-shell polymer particles is less than 100 weight percent; typically no more than 98 weight percent, and more typically no more than 96 weight percent. These weight percentages are based on the total weight of the polymer particles of the impact modifier.

For the purposes of preparing impact modifier powders of the present invention which are compaction-free, it is desirable to spray dry the core-shell polymer particle dispersions with a flow aid. Accordingly, the weight percentage of flow aid in the compaction-free impact modifier powders of the present invention is typically greater than 1.5 weight percent; more typically greater than 2 weight percent; and even more typically, greater than 3 weight percent. Likewise, the weight percentage of flow aid in the powdery impact modifier is typically no more than 10 weight percent; more typically no more than 8 weight percent; and even more typically no more than 5 weight percent. The aforementioned weight percentages are based on the total weight of the impact modifier, which includes the polymer particles and the flow aid. If more than one type of flow aid is used to spray dry the dispersion, then the aforementioned flow aid weight percentages refer to the total weight percentages of all flow aids used.

Thus, we have found that the core-shell polymer particles of the present invention having 90 weight percent rubber content do not typically require flow aids to prepare impact modifier powders according to the present invention. However, for preparing impact modifier powders which are compaction-free, the core-shell polymer particle dispersions of the present invention can be spray dried with flow aid amounts of at least 1.5 weight percent. Impact modifiers having higher rubber contents will typically require a higher minimum amount of flow aid. Accordingly, 91 to 93 weight percent rubber content core-shell polymer particles will typically require at least 2 weight percent flow aid; 94 weight percent rubber content particles will typically require at least 2.5 weight percent flow aid; 95 to 96 weight percent rubber content particles will typically require at least 4 weight percent flow aid; and 100 weight percent rubber content core-shell polymer particles will typically require at least 8 weight percent flow aid. These weight percentages are based on the total weight of the impact modifier, which includes the polymer particles and the flow aid.

Although higher levels of flow aid will help achieve the desired improved drying and flow characteristics, higher amounts of flow aid typically reduces the impact efficiency. It is therefore desirable to incorporate only the minimum amount of flow aid when a compaction-free powder is desired. Typically, a compaction-free powder is more desirable than a powder which is not compaction-free.

The spray-drying can be conducted in any of a variety of designs. The core-shell polymer particle dispersion is atomized either by a wheel or by a nozzle, and the drying gas can enter from the top or the bottom of the FE atomization chamber. The drying gas is typically heated air or nitrogen to provide a powder temperature which is between the outlet temperature and wet bulb temperature of the drying gas. For acrylic core-shell polymer compositions of the present invention, powder temperatures are maintained less than 80° C., typically less than 65° C., and more typically less than 55° C to provide free-flowing powders. Likewise, powder temperatures are maintained greater than 20° C., typically greater than 30° C., and more typically greater than 40° C. to provide free-flowing powders at efficient production rates.

In the spray drying process, optional flow aid may be blown into the atomization chamber by a separate gas stream or fed into the atomization chamber at such a rate to give the desired weight percentage based on total polymer particles and flow aid. The flow aid is typically an inert particulate material having a particle size in the range of from 0.005 to 10 microns. Both organic and inorganic flow aids may be used in the present invention. Many suitable flow aids are commercially available. Organic flow aids typically include hard polymer particles having softening temperature greater than that of the spray drying conditions (e.g., polymethyl methacrylate). It is also envisioned that flours from plant products such as cellulose fiber, wood and nut shells may also be incorporated as flow aids. Suitable inorganic flow aids typically include a variety of compositions, e.g.: glass beads; metals, minerals such as calcium carbonates, alumina trihydrates, micas, magnesium carbonates, magnesium hydroxide; talcs; clays such as alumina silicates; ceramics; precipitated amorphous silica; fumed silica; diatomaceous earth, pigments such as titanium dioxide. Both stearic-acid coated and uncoated calcium carbonate flow aids are typically used. Various particulate compositions known as "anti-blocking agents" and "fillers" are also useful as flow aids. It is desirable that the flow aids are chemically inert and substantially non-reactive with any of the other components commonly found in plastics compositions at process conditions.

The spray dried powders of the present invention are characterized by having a mean particle diameter of at least 10 microns; typically at least 25 microns; more typically at least 50 microns; and even more typically at least 100 microns. Spray dried powders of the present invention are characterized by having a mean particle diameter of at most 1000 microns; typically at most 750 microns; more typically at most 500 microns; and even more typically at most 250 microns. Powder particles larger than 1000 microns are typically undesirable, and are subsequently filtered out of the powdery impact modifier product.

The spray dried powders of the present invention are characterized as free-flowing and low-dust. Typically, these powder properties are achieved when the water content is less than 15 weight percent, typically less than 10 weight percent, more typically less than 5 weight percent, even more typically less than 3 weight percent, and most typically less than 1 weight percent.

One variation of the present invention includes adding one or more other known plastic additive compositions, in either powder or aqueous form. These additives can be optionally blended into the composition before, during, or after the final spray drying step using standard equipment such as high-speed mixers, blenders, kneaders, extruders, fluidized drying beds. Other ingredients typically blended in thermoplastic formulations, such as lubricants, thermal stabilizers, waxes, dyes, pigments, fillers, may each have an aqueous solution, liquid, powdered, or pellet form, and may also be included in the present invention using this mixing equipment.

The two or more populations of the core-shell polymer particles used in the present invention can be provided for in a number of ways known in the art of polymer science. One method involves blending of distinct polymer particle dispersions, e.g., those prepared by emulsion polymerization, each having their own particle size; and in-situ formation and polymerization of a second particle population in the presence of a previously polymerized particle population. In another method, free radical emulsion polymerization techniques are used while providing polymer seeds at different points in the process to provide for two or more populations of core-shell polymer particles.

In the processes for preparing the polymer particle dispersions as provided herein, it is typical that the weight percentage of the polymer particles is at least 25 weight percent; and more typically at least 40 weight percent, and even more typically at least 50 weight percent. In the processes for preparing the polymer particle dispersions as provided herein, it is typical that the weight percentage of the polymer particles is no more than 75 weight percent; and more typically no more than 65 weight percent, and even more typically no more than 60 weight percent.

Two or more populations of core-shell polymer particles can also be provided by an emulsion polymerization process in which a second (or subsequent) population of polymer particles is created in the presence of a first (or previous) population. The following procedure is illustrative: Starting with at least one seed polymer particle population in a reaction mixture, add additional soap, and add a portion of a monomer mixture and initiator to form a second (or subsequent) population of polymer particles of different size. Next, polymerize the remaining monomers in the monomer mixture to result in at least two populations of polymer particles which have mean particle diameters that vary by more than 50 percent.

When the spray-driable polymer particle dispersion is in an emulsion form, the dispersion may further contain surfactants, emulsifiers, stabilizers, ionic salts, acid or base, oligomeric species. In an emulsion form, the polymer particles are typically synthesized by an emulsion process or prepared by an alternative polymerization process and then subsequently emulsified. More typically, the polymer particles are prepared using emulsion polymerization techniques using various ethylenically unsaturated monomers such as those based on acrylics, dienes, vinyl-halides, vinyl aromatics, ethylene-vinyl acetates, and combinations thereof.

The spray-driable polymer particle dispersions may also be provided using a process requiring at least two steps of (a) providing an aqueous emulsion polymerization reaction mixture comprising a first population of polymer particles and a second population of polymer particles; and (b) polymerizing a first group of one or more ethylenically unsaturated monomers in the aqueous emulsion polymerization reaction mixture so that at least one of said populations of polymer particles increases in mean particle diameter. Although this process requires that after a portion of the first group of one or more ethylenically unsaturated monomers is polymerized the mean particle diameters of the first and second populations of polymer particles differ by at least 50 percent, it is typical that the mean particle diameters differ by at least 100 percent, and more typical that the mean particle diameters differ by at least 200 percent.

The spray-driable polymer particle dispersion may also be provided using a process related to the previously described process. This related process requires at least the two steps of (a) providing an aqueous emulsion polymerization reaction mixture comprising a first population of polymer particles and a second population of polymer particles; and (b) polymerizing a first group of one or more ethylenically unsaturated monomers in the aqueous emulsion polymerization reaction mixture to form a third population of polymer particles, wherein after a portion of the first group of one or more ethylenically unsaturated monomers is polymerized. Although this process requires that after a portion of the first group of one or more ethylenically unsaturated monomers is polymerized the mean particle diameters of the first and second populations of polymer particles differ by at least 50 percent, it is typically that the mean particle diameters differ by at least 100 percent, more preferable that the mean particle diameters differ by 200 percent.

In the aforementioned processes, the first and second populations of core-shell polymer particles in the aqueous emulsion polymerization reaction mixture of step (a) can be provided by a dispersion combination of the first and second populations of polymer particles. In this case, the dispersion combination may be provided by combining separate dispersions of the first and second populations of polymer particles.

In the aforementioned processes, the first and second populations of polymer particles in the aqueous emulsion polymerization reaction mixture of step (a) can also be provided by a dispersion combination of the first and second populations of polymer particles. In this case, the dispersion combination may be provided by forming one of the populations of polymer particles in a dispersion of the other population of polymer particles.

In the aforementioned two processes, the first and second populations of polymer particles in the aqueous emulsion polymerization reaction mixture of step (a) are provided by a dispersion combination of the first and second populations of polymer particles, wherein the dispersion combination is provided by forming substantially simultaneously the first and second populations of polymer particles in a dispersion.

In these processes where the two populations of polymer particles are present, it envisioned that both populations may grow in size during step (b). Likewise, in the embodiment where a third population of polymer particles forms, it is envisioned that at least one of the first and second populations of polymer particles may grow in size during step (b), however it is possible that both the first and second populations may grow in size during step (b) during formation of the third population of polymer particles. This may be accomplished, when after making the second mode using the soap addition, more soap is added to make the third population of polymer particles.

In another process for providing the core-shell polymer particle dispersion used in the present invention, three or more polymer seed particles can be provided to the reaction mixture. One specific embodiment is where a third polymer seed particle is added to the first two. Multi-populations of polymer particles can also be prepared using even more polymer seed particles.

Accordingly, two-population and three-population core-shell polymer particle dispersions can be provided wherein at least one of the first and second populations of polymer particles substantially does not grow in size during step (b). This can be provided where one of the polymer particles is not soluble with monomer, e.g., providing highly crosslinked polymer particles or selecting polymer types which are not soluble with monomer. Alternatively, where the rate of polymerization in one seed population is substantially faster than in a second seed population, then (for kinetic reasons) the second population would typically not grow under these conditions.

As well, in the three-population process, both the first and second populations of polymer particles typically do not grow in size during step (b). As discussed above, it is possible to provide two populations of polymer particles which do not grow in size, however the addition of extra soap provides an additional one or more modes which can grow in size. Alternatively, an independent mode can be prepared using a large swollen particle and smaller emulsion polymer particles so that independent polymerization in two different modes result. Other combinations of growing and non-growing polymer particles can be envisioned for providing various populations of polymer particles.

In both of these processes for making a spray-driable polymer particle dispersion having two and three particle populations, it is envisioned that the weight fraction of the first population of polymer particles based on total polymer particle weight is at least 5 weight percent, typically at least 10 weight percent, more typically at least 15 weight percent, and even more typically at least 20 weight percent. Likewise, it is also envisioned that the weight fraction of the second population of polymer particles based on total polymer particle weight is at least 5 weight percent, typically at least 10 weight percent, more typically at least 15 weight percent, and even more typically at least 20 weight percent. Typically, the smaller population weight fraction is at least 20 weight percent based on total weight of polymer particles. Typically, the smaller population weight fraction is at most 60 weight percent. based on total weight of polymer particles.

In the spray-driable polymer particle dispersion having either two and three particle populations, it is also envisioned that the chemical compositions of the polymer particles in the first and second populations are substantially the same, or different. They also can be substantially physically the same or different. An example of a physical difference is wherein the ethylenically unsaturated monomers form a polymer having different glass transition temperatures (Tg) according to the Fox equation. Typically, rubbery polymers have a Tg less than 25° C. For providing polymer Tg less than 25° C., typical monomers include: C1 to C18 alkyl acrylates such as butyl acrylate, ethyl acrylate, 2-ethylhexyl acrylate; diene monomers; vinyl acetate monomers; and copolymers thereof.

In the core-shell polymer particles used in the present invention, the ethylenically unsaturated monomers used to form an outer polymer phase forms a polymer having a Tg according to the Fox equation of at least 25° C., which is typically characteristic of forming hard polymers. For Tg greater than 25° C, typical monomers include: C1–C4 alkyl methacrylates; vinyl aromatic monomers, acrylonitrile monomers, and copolymers thereof. One skilled in the art can combine various ethylenically unsaturated monomers in various ratios for the purposes of preparing "hard" versus "soft", and "brittle" versus "rubbery" polymer phases in one or more specific embodiments of the core-shell polymer particle populations used in the present invention.

It is further envisioned that the processes for making two-, and three-particle populations may further contain a third step (c), which involves polymerizing a second group of one or more ethylenically unsaturated monomers in the presence of at least the first and second population of polymer particles to provide a polymer adjacent to the surfaces of the polymer particles of the first and second populations. In this additional step, it is envisioned that the second group of one or more ethylenically unsaturated monomers can be the same as or different than the first group of one or more ethylenically unsaturated monomers. In varying the properties of impact modifiers, for example, one typically controls: degree of crosslinking in the core rubber; degree of graft-linking of polymer shells to underlying phases, such as the core; molecular weight of the polymer shell; and morphology (e.g., a shell or diffusion of particles into the core). In this additional step, it is also envisioned that the second group of one or more ethylenically unsaturated monomers is polymerized after at least a portion of the first group of one or more ethylenically unsaturated monomers is polymerized. It is within the purview of this invention that any combination of cores, shells, interpolymer phases, monomers, crosslinkers, and graftlinkers is possible for preparing the core-shell polymer particles used in the present invention.

In these embodiments wherein a second group of ethylenically unsaturated monomers are polymerized, it is within the purview of the present invention that the second group of monomers is polymerized after substantially all of the first group of monomers are polymerized. This step is useful for controlling morphology.

In preparing a spray-driable polymer particle dispersion used in the present invention, it is envisioned that the first group of monomers forms a rubbery core polymer and the second group of monomers forms a hard shell polymer. Rubbery core monomers include, for example, alkyl acrylates. The rubbery core monomers may also include one or more crosslinkers in the amount of 1 percent to 5 percent based on monomers. In the case where the rubbery monomers include diene monomers, crosslinker may not be necessary as diene monomers tend to self-crosslink. Such self-crosslinking depends on the reaction conditions and post-reaction conditions as known in the art. The hard shell monomers may contain, as a specific example, methyl methacrylate and styrene.

Oftentimes, in making core/shell type polymer particles, the second group of monomers can be added to the reaction mixture before the first group has been completely polymerized so that both monomers from the first and second groups are simultaneously present in the reaction mixture. In this situation, it is also envisaged that while the second group of monomers do not necessarily copolymerize with the unpolymerized monomers from the first group, it is often times desirable that at least a portion of the second group of monomers copolymerize with a portion of the unpolymerized monomers from the first group of monomers. Likewise, it is oftentimes desirable that at least a portion of the second group of monomers copolymerizes with substantially all of the unpolymerized monomers from the first group of monomers. This process can be controlled by comparing the reactivity ratios of monomers, as known in the art, for preparing separate, alternating, blocky, or random copolymers.

With regard to one specific example wherein the spray-driable polymer particle dispersion is in an emulsion form, reactants (e.g., monomers, initiators, emulsifiers, and optional chain transfer agents, etc.) are typically combined in a reactor with a liquid medium (e.g., an aqueous medium) to form a mixture. Thereafter, and/or simultaneously therewith, the mixture is reacted while in the presence of the liquid medium. The reactants can be added slowly (gradually, as in a semi-batch process), over time, continuously, or quickly as a "shot" (batch) into the reactor. Emulsion polymerization techniques for preparing polymer particles are typically carried out in a suitable reactor wherein the reactants (monomers, initiators, emulsifiers, pH buffers, salts, acids, bases, optional chain transfer agents) are suitably combined and mixed, and reacted in an aqueous medium, and wherein heat may be transferred in to, and away from, the reaction zone.

In another specific example wherein the spray-driable polymer particle dispersion is in an emulsion form, the process encompasses at least the following steps. First, an aqueous emulsion polymerization reaction mixture is provided which includes a first and second population of polymer particles. These polymer particles as provided for in the reaction mixture are typically referred to by those skilled in the art of emulsion polymerization as "polymer seed particles", "seed particles", or simply "seed". It is also known to those skilled in the art that polymer particles formed in one step may be further used as seed particles in another step. Then, a first group of one or more ethylenically unsaturated monomers is polymerized in the aqueous emulsion such that the mean particle diameters of the first and second populations of polymer particles differ from each other by at least 50 percent. After the polymer particle populations are provided for in a reaction mixture, monomers are subsequently added in order to provide for "grow out" of one or both of the polymer seed particle populations. In this invention it is envisioned that when both seed particle populations "grow out", this grow-out can occur simultaneously or at different times.

Methods for polymer seed grow out are well known in the art. These methods are useful for preparing polymer particles having a particle size in the range of from 10 nm to 1,500 nm. Typically, monomer and initiator are added to the reaction mixture at conditions to initiate and polymerize monomer as it is added to the reaction mixture. Typically, the polymer particle size will increase with increasing seed size. Accordingly, the seed size range can vary from 10 nm to 1,500 nm. In this embodiment, the seed size is typically at least 30 nm, more typically at least 70 nm, and most typically at least 100 nm.

One specific example of providing spray driable polymer particle dispersion of the present invention is where a single polymer seed and excess soap is provided into the reaction mixture so that upon addition of monomer, a second population of polymer particles is formed. In this example, the amount of excess soap that is required to form the second population of polymer particles will vary with the type of soap, and conditions of the reaction media to form micelles. Subsequent or simultaneous addition of monomer and initiator into the reaction mixture thereby forms the second population of polymer particles. This is followed by one or more additional "grow out" steps as described above. Further steps providing additional populations of seed particles followed by grow-out are also envisioned within the scope of the present invention.

Another specific example is where seeds of two or more sizes are provided, followed by a swelling process. Seeds of two or more sizes can be provided as previously described. The swelling process typically involves adding emulsified monomers, or mixtures of monomers to seed particles present the aqueous reaction media so that the seed particles swell with monomer prior to forming polymer. The initiator is typically present in the monomer mixture or subsequently added to the reaction mixture. Then, the monomers are polymerized after swelling. By this process, there is no limitation to the upper size of the mean polymer diameter.

Another specific example of forming two populations of polymer seed particles is provided where polymer seed particles of a single mode are partially agglomerated (i.e. "microagglomerated", as known in the art). In this example, the seed particles agglomerate to different extents, thereby forming two or more populations of seed particles. Although such microagglomeration steps typically require polymer particle solids levels less than 40 percent, it is envisioned that further swelling and/or grow-out steps applied to such microagglomerated seed particles will result in formation of spray-driable polymer particle dispersions having solids fractions at least 40 percent.

Preparing a combination of two polymer particle populations which differ in particle size can be provided using two seeds which vary in size and/or composition. The final size of the particles depend on the starting size and the starting composition of the seeds. If the seeds are the same compositions, then they typically grow and/or swell at similar rates of "mass uptake". The term "mass uptake" refers to the increase in mass of the polymer particles arising from additional monomer and/or polymer.

Extent of mass uptake may be estimated according to polymer thermodynamic principles known to those skilled in the art. For example, if the seed compositions are different, then the rate of mass uptake will generally be different. If the seeds are the same composition but different size, then the larger seed particles will generally remain larger during mass uptake. As well, increasing the molecular weight of the polymer in the seeds generally provides smaller polymer particles. Generally, these and other guidelines for controlling polymer particle size are estimable via equilibrium swelling calculations according to the principles of polymer thermodynamics and reaction kinetics as known to those skilled in the art.

Typically, particle sizes in the range of from 100 nm to 50,000 nm can be provided using the swelling process. More typically, polymer particles in the range of from 1,000 nm to 5,000 nm are readily prepared by a swelling process.

It is also envisioned that one or more of these methods may be combined to prepare the spray-driable polymer particle dispersions of the present invention. Those skilled in the art would be able to readily determine which specific process best suits their needs after reading this specification.

In yet another specific example wherein the spray-driable polymer particle dispersion is in an emulsion form, the process encompasses at least the following steps. First, an aqueous emulsion polymerization reaction mixture is provided which includes a first population and second population of polymer particles.

Then, a first group of one or more ethylenically unsaturated monomers is polymerized in the aqueous emulsion such that a third population of polymer particles is formed. Formation of the third population can be provided by the addition of excess soap to form seed particles as described in a previous embodiment, or they can be added separately. The step of swelling and/or grow-out of the first, second, and/or third population of polymer particles subsequently follows according to the procedures described in a previous embodiment.

These various methods for preparing populations of polymer particles may include one or more of the liquids in the following group: monomers, solvents, non-solvents, chain transfer agents, initiators, soaps, buffer solutions, stabilizers to prevent polymer particle coalescence, crosslinkers, graft linkers, aqueous phase inhibitors for preventing polymerization in the aqueous phase. Accordingly, the spray-driable polymer particle dispersions of the present invention typically include one or more of these liquids.

Examples of polymer particle compositions which are envisioned within the scope of the present invention include the following polymer compositions:

polymers derived from diene, diene/vinyl aromatic, or crosslinked diene/vinyl aromatic monomers; polymers derived from (C1 to C20) alkyl (meth)acrylates; 30 copolymers derived from (C1 to C20) alkyl (meth)acrylates, (e.g. 2-ethylhexyl acrylate mixed with a butyl acrylate); copolymers derived from (C1 to C20) alkyl (meth)acrylates which vary in comonomer ratio; copolymers derived from (C1 to C20) alkyl (meth)acrylates which vary in comonomer ratio to provide for differences in glass transition temperatures, e.g., high Tg (greater than 75 C) polymer and low Tg polymer and (less than 0 C); ethylene-vinylacetate ("EVA") type copolymers; chlorinated polyethylene ("CPE"); polymers derived from olefins; copolymers or blends containing copolymers derived from (C1 to C20) alkyl (meth)acrylates mixed with EVA or chlorinated polyethylene ("CPE") or polyolefins.

One specific example of different compositions of polymer particles is when a balance of impact efficiency and UV resistance is desired. In this case, different compositions can be provided by the following process: emulsion blend of a diene-containing impact modifier with an acrylic-based impact modifier.

One specific example of different types of core-shell polymer particles is where the first and second populations are useful as impact modifiers and the additional one or more populations are useful as processing aids. Combinations of various polymeric additives are readily envisioned to those skilled in the art.

The spray-driable polymer particle dispersion may also contain polymer particles to balance impact efficiency and UV resistance. In this case, different compositions can be provided by the following process: emulsion blend of a diene-derived impact modifier with an acrylic-derived impact modifier. For the purposes of preparing high solids, it is envisioned to start with two diene-derived polymer seed particles varying in diameter for preparing the first and second populations of polymer particles varying at least 50 percent in diameter. Diene-type monomers are subsequently polymerized in the presence of these seed particles to form the first and second populations of diene-derived polymer particles. Additional seed particles are either added to or formed in the reaction media containing the first and second populations of diene-derived polymer particles. Subsequently, polymerization of another type of one or more monomers, such as a (C1–C20) alkyl (meth)acrylates form on or in the additional seed particles.

In the spray-driable polymer particle dispersion used in the present invention, an additional plastics additive component can be readily incorporated into the particle dispersion by direct addition, emulsification or suspension by suspending agents in water or a suitable solvent, and optionally applying shear. The amount of these optional components can be in the range of from 0 to 100 weight percent; typically from 0 to 20 weight percent; most typically from 0 to 10 weight percent of the liquid component. The amount of emulsion stabilizers can be in the range of from 0 to 100 weight percent; typically from 0 to 5 weight percent; most typically from 0.01 to 2 weight percent of the liquid component. The amount of defoamers can be in the range of from 0 to 100 weight percent; typically from 0 to 10 weight percent; most typically from 0 to 5 weight percent, the weight percentage being based on the water in the dispersion.

In one specific embodiment of the process for preparing a spray-driable polymer particle dispersion, a dispersion of solid or liquid lubricant particles may also be incorporated in the spray-driable polymer particle dispersion by emulsifying the solid or liquid lubricant in water or other non-solvent with a surfactant and shear mixing. The lubricant dispersion is then mixed into the spray-driable polymer particle dispersion. In a similar fashion, the solid or liquid lubricant may be emulsified in an emulsion, latex, dispersion, or suspension containing one or more other components of the spray-driable polymer particle dispersion as another embodiment. One specific example is where the lubricant may be emulsified by adding a surfactant and shear mixing in a high solids emulsion containing the two or more populations of core-shell polymer particles. In a similar fashion, because thermal stabilizers are mostly provided as liquids, oils, or solids which are typically non-soluble in water, thermal stabilizers may also be emulsified and added to the spray-driable polymer particle dispersion according to these procedures. The spray-driable polymer particle dispersion may also contain stabilizers and lubricants which can be incorporated into the water component using organic solvents. Because stabilizers and lubricants are typically insoluble in water, they may be incorporated into the liquid component of the spray-driable polymer particle dispersion by using organic solvents and/or soap to help dissolve or disperse them. In this regard, various solvent/oil/aqueous/soap combinations may be employed to provide dispersions or solutions of one or more additives, such as stabilizers and lubricants, in the water component of the spray-driable polymer particle dispersion.

The impact modifier powders of the present invention may be used in various ways, including the preparation of novel polymeric composition blends which include a matrix resin component and a core-shell impact modifier component. The blends of the present invention contain a matrix resin and an impact modifier powder of the present invention, wherein the weight ratio of the impact modifier to the resin is in the range of from 1:99 to 99:1. These blends are readily prepared by blending methods that are known in the art of plastics processing. For example, the plastics additive powders of the present invention can be blended with thermoplastic resin powders or pellets and melt processed using an extruder.

The blends of the present invention are especially useful as impact-modified thermoplastics when the weight ratio of additive to resin is in the range of from 3:97 to 30:70. The blends of the present invention can also be blended with higher amounts of the powders of the present invention for preparing concentrated pellets of the impact modifiers of the present invention.

The blends of the present invention may also be formed into pellets by the steps of blending, extruding and pelletizing using conventional plastics processing equipment. Such pellets may readily contain the impact modifier powders of the present invention and one or more resins in the weight ratio of powder to resin can be in the range of from 10:90 to 80:20.

The blends of the present invention have many uses, including calendered sheet, thermoformed sheet, injection molded articles, blow-molded articles, extruded articles. When the refractive index of the impact modifier is carefully matched to that of transparent resins, the resulting impact modifier is useful in applications requiring transparency.

The impact modifiers of the present invention are typically blended into poly(vinyl chloride) ("PVC") and chlorinated PVC ("CPVC") to improve impact strength. The impact modifiers of the present invention are especially useful for manufacturing PVC siding, window profiles, and other exterior building products where both impact strength and weatherability of the PVC product are needed. The impact modifiers are useful for preparing PVC siding when the impact modifier is present in the PVC formulation in the range of from 4 to 20 parts per hundred resin ("phr").

The impact modifier powders may be blended into many resins other than PVC, including thermoplastics based on polymers and copolymers of alkyl (meth) methacrylate, vinyl aromatics (e.g., styrene), and/or (meth)acrylonitrile, aromatic polyesters such as poly(ethylene terephthalate) or poly(butylene terephthalate), polycarbonates, polyamides, polyacetals, and polyolefins. The impact modifiers may be admixed with various blends and alloys of one or more of these thermoplastic resins. The utility of such blends is varied, but include articles used in building and construction industries, such as vinyl siding and window profiles, equipment panels and housings, such as for appliances or computers, and automobile parts such as door panels and bumpers. The impact modifiers may also be admixed with thermosetting resins.

EXAMPLES

The abbreviations listed below are used throughout the examples:
MMA=Methyl Methacrylate
BA=Butyl Acrylate
SLS=Sodium Lauryl Sulfate (28 percent)
ALMA=Allyl Methacrylate
t-BHP=Tertiary-butyl hydroperoxide
SSF=Sodium Formaldehyde Sulfoxylate
NaPS=Sodium Persulfate
Na2SO4=Sodium Sulfate
DIW=deionized water
wt percent=percent by weight on total monomer
ppm=parts per million on total monomer
nm=nanometers
C.=degrees Celsius Example 1

A spray-driable polymer particle dispersion having greater than 90 weight percent of a polybutylacrylate rubbery component was prepared according to the following procedure: An emulsion polymerization reaction was carried out in a reactor equipped with an agitator, a thermocouple, and heating and cooling means. The reactor was charged with 1562 parts of DIW at 55C and 1,260 parts of a crosslinked polybutyl acrylate polymer seed dispersion having a mean particle diameter of 230 nm and a solids weight fraction of 50.8 percent. The reactor contents were sparged with nitrogen for thirty minutes. After the sparge, 1.4 parts of tartaric acid diluted in 100 parts of DIW were added to the reactor. Immediately, 70.3 parts of SLS (28 percent) were added to the reactor. A nitrogen sweep was applied after the SLS charge. A monomer emulsion was made up containing 2,231.7 parts of DIW, 117.1 parts of SLS, 6321.1 parts of BA, 44.6 parts of ALMA. With the reactor at 50 C, 893.6 parts of the monomer emulsion was added to the reactor. After this first charge of monomer emulsion, 1.12 parts of t-BHP was added to initiate the reaction. The reactor temperature increased to 60 C and the batch was held at peak temperature for an additional 15 minutes. After this first charge of monomer emulsion, an additional 65.1 parts of SLS and 248.5 parts of DIW was added to the remaining monomer emulsion. The reactor contents were cooled to 53 C and then a second charge of 1,295.2 parts of monomer emulsion was added to the reactor. Immediately, 2.08 parts of t-BHP were added to the reactor to initiate the reaction. The reactor temperature increased to above 75 C and the batch was held at peak temperature for an additional 15 minutes. After the hold, 20 parts of Sodium Sulfate diluted with 2,155 parts of DIW was added to the kettle. After this addition, the batch was cooled to 45 C and 2,220.6 parts of monomer emulsion were added to the reactor. Immediately, 3.57 parts of t-BHP were added to the reactor to initiate the reaction. The reactor temperature increased and the peak temperature reached above 85 C. The batch was held at peak temperature for an additional 15 minutes. The reactor contents were cooled to 55C and the remaining monomer emulsion (2,138.3 parts) were added to the kettle. Immediately, 3.43 parts of t-BHP were added to the reactor to initiate the reaction. The reactor temperature increased and the peak temperature reached above 80C The batch was held at peak temperature for 3 minutes. After three minutes, 1.16 parts of t-BHP and 1.01 parts SSF diluted in 48.2 parts of DIW were added to the reactor. The reactor contents were held at temperature for an additional 30 minutes.

A second monomer emulsion was prepared containing 260.3 parts of DIW, 15.6 parts of SLS and 447.2 parts of MMA. After the 30 minute hold, the reactor contents were cooled to 53 C. At 53 C, the second monomer emulsion was completely added to the reactor. Immediately, 0.9 parts SSF diluted in 52 parts of DIW followed by 0.9 parts NaPS were added to the reactor to initiate the reaction. The batch temperature increased to 55 C. The nitrogen sweep was turned off at peak temperature. The reactor contents were held at peak temperature for an additional 60 minutes. The reactor was cooled to 40 C and the reactor contents were filtered through a 400 micron filter. The final solids fraction of the polymer particle dispersion was 49 weight percent.

Capillary Hydrodynamic Flow Fractionation ("CHDF") was used to measure the mean particle diameter and weight percentages of the two polymer populations of the core-shell polymer particle dispersion. The mean particle diameters of the first and second populations of polymer particles were, respectively, 330 nm and 110 nm. The weight percentages of the first and second populations of polymer particles based on total polymer particles were, respectively, 35 percent and 65 percent. The resulting core-shell polymers contained 94 weight percent of an inner rubbery phase and 6 weight percent of a outer hard polymer phase.

Example 2

The aforementioned polymer particle dispersion was diluted to 46.9 weight percent solids and spray dried using from 4.0 to 4.5 weight percent of Multifex MM Ultrafine P calcium carbonate, mean particle size of from 60 to 90 nm (Whitaker, Clark and Daniels, South Plainfield, N.J.). A tower spray dryer equipped with a spray nozzle was used at the following operating conditions to provide an estimated powder temperature of approximately 49° C.: nozzle pressure was 1550 psi (10.6 MPa); emulsion feed rate was 1806 parts per hour; powder rate was 800 parts per hour; flow aid was co-fed as a powder into the dryer so that it formed a cloud when it contacted the emulsion spray; the flow aid feed rate was maintained to provide 4.0 to 4.5 weight percent flow aid in the final impact modifier powder. A free flowing impact modifier powder having a mean powder particle diameter of 230 microns and a powder density of 325 grams per liter was produced. A compaction-free powder was evident as the resulting powder did not stick together in a solid mass when hand-squeezed.

Example 3

The polymer particle dispersion of Example 1 was spray dried according to the same conditions as described in Example 2, with the exception that the flow aid weight fraction was 2.5 weight percent. The resulting powder was free-flowing but not compaction-free.

Examples 4 to 12

The procedure described in Example 1 was generally followed to prepare several spray driable particle dispersions having a 94 weight percent rubber content. The dispersions varied in: total particle solids weight fraction, weight fraction of each population, and mean particle size of each population. Each of these dispersions were spray driable without flow aid to a free-flowing powder. These dispersions are described in Table 1.

Examples 13 to 14

The procedure described in Example 1 was generally followed to prepare a spray driable particle dispersions having a 94 weight percent rubber content. In these examples, the seed polymer particle was 330 nm to prepare dispersions which varied in: total particle solids weight fraction, weight fraction of each population, and mean particle size of each population. Each of these dispersions were spray driable without flow aid to a free-flowing powder. These dispersions are described in Table 1.

Examples 15 to 24

The spray driable particle dispersions of Examples 4 to 14 were also spray dried with flow aid into impact modifier powders according to the general procedure described in Example 2. In these examples, the flow aid was a stearic acid coated calcium carbonate (Winnofil S). The powder characteristics results show that the amount of flow aid required to provide compaction-free impact modifier powders having a 94 weight percent rubber content is greater than 1.6 weight percent. In several of these examples an acrylic processing aid emulsion was blended and co-spray dried with the dispersions. Additional surfactant (SLS) was added to the dispersions (weight percent based on weight total dispersion) to ensure shear stability during spray drying. These results are described in Table 2.

TABLE 1

| Ex. | Solids Wt. % | Particle Populations (size, weight percent) by CHDF | Viscosity, centipoise [a] |
|---|---|---|---|
| 4 | 49.0% | 112 nm, 68%; 289 nm, 32% | 1424 |
| 5 | 49.6% | 110 nm, 62%; 334 nm, 38% | 1284 |
| 6 | 45.6% | 93.5 nm, 59%; 311 nm, 37.5%; 470 nm, 2.5% | 512 |
| 7 | 48.8% | 126 nm, 58%; 347 nm, 41%; 538 nm, 1% | 396 |
| 8 | 48.2% | 116 nm, 57%; 368 nm, 43% | 520 |
| 9 | 47.4% | 119 nm, 60%; 362 nm, 40% | 480 |
| 10 | 48.8% | 108 nm, 63.6%; 323 nm, 36.4% | 1276 [b] |
| 11 | 47.0% | 95.2 nm, 66.6%; 313.8 nm, 33.4% | 1276 [b] |
| 12 | 46.6% | 85.5 nm, 67.3%; 300.5 nm, 32.7% | 1276 [b] |
| 13 | 61.9% | 133.2 nm, 34.4%; 540 nm, 65.6% | 448 [c] |
| 14 | 63.1% | 115.4 nm, 28%; 54 nm, 72% | 448 [c] |

[a] Measured using a Brookfield Viscometer, #3 Spindle at 30 RPM
[b] Viscosity measurement made on combination of examples 10, 11, and 12.
[c] Viscosity measurement made on combination of examples 13 and 14.

TABLE 2

| Ex. | Dispersion Example | Additional Processing Aid, phr | Flow Aid, % | SLS added to dispersion | Compaction-free powder? |
|---|---|---|---|---|---|
| 15 | Ex. 4 | 1.0 [a] | 1.90 | 0.63% | yes |
| 16 | Ex. 5 | 1.0 [a] | 1.60 | 0.63% | no |
| 17 | Ex. 6 | none | 2.79 | 1% | yes |
| 18 | Blend of Examples 7–12 | none | 2.70 | 0.50% | yes |
| 19 | Blend of Examples 7–12 | none | 3.30 | 0.50% | yes |

TABLE 2-continued

| Ex. | Dispersion Example | Additional Processing Aid, phr | Flow Aid, % | SLS added to dispersion | Compaction-free powder? |
|---|---|---|---|---|---|
| 20 | Blend of Examples 7–12 | none | 3.20 | 0.50% | yes |
| 21 | Blend of Examples 7–12 | 0.78 [b] | 0.90 | 0.50% | no |
| 22 | | 0.78 [b] | 2.40 | 0.50% | yes |
| 23 | | 0.78 [b] | 3.60 | 0.50% | yes |
| 24 | Blend of Examples 13 and 14 | none | 2.50 | 0.50% | yes |

[a] A processing aid dispersion of two-stage polymer particles was prepared according to the procedure described in Example 1 of U.S. Pat. No. 3,833,686 with the following modifications: the composition of stage 1 was 60% MMA, and 40% EA; the composition of stage 2 was MMA; the weight ratio of stage 1:stage 2 was 1:3; the mean particle size was 250 nm; the solids weight fraction of the particle dispersion was 54%. The Mw measured by GPC was 1.2 million g/mol. The Tg of the overall polymer measured by DSC was 97° C. 1 PHR of this processing aid was blended with 7 PHR of the core-shell polymer, based solids, prior to spray drying.
[b] A processing aid dispersion of two-stage polymer particles was prepared according to the procedure described in U.S. Pat. No. 3,833,686 with the following modifications: the composition of stage 1 was 55% MMA, 35% EA; and 10% BMA; the composition of stage 2 was 88% MMA; 6% EA amd 6% BMA; the weight ratio of stage 1:stage 2 was 1:3; the mean particle size was 170 nm; and the solids weight fraction of the particle dispersion was 48%. The Mw measured by GPC was 3.2 million g/mol. The Tg of the overall polymer measured by DSC was 90° C. 0.78 PHR of this processing aid was blended with 7 PHR of the core-shell polymer dispersion, based on solids, prior to spray drying.

Impact Testing

The impact modifier powders prepared according to Examples 15 to 24 were blended at 7 PHR with a polyvinyl chloride (PVC) lead masterbatch according to the formulation in Table 3. Plaques obtained by milling and molding of the above mixture were tested for impact resistance according to the BSI Charpy method with 10 bars per plaque (duplicate) at several testing temperatures. The plaques exhibited an improvement in impact strength comparable to or better than similar plaques prepared using commercially-available impact modifier powders.

TABLE 3

Pvc Lead Masterbatch Formulation

| Ingredient, Source | phr |
|---|---|
| PVC K-68 | 100 |
| Dibasic Pb Phosphite | 3 |
| Neutral Pb Stearate | 0.3 |
| Dibasic Pb Stearate | 0.7 |
| Calcium Stearate | 0.3 |
| Dicarboxylic acid ester | 0.4 |
| Neutral Ester Wax | 0.5 |
| AC-307A High MW polyethylene wax (Allied-Signal) | 0.05 |
| Processing Aid, PARALOID K-175 (Rohm and Haas, Philadelphia, PA) | 0.5 |
| CaCO3 | 5 |
| TiO2 | 4 |
| Impact Modifier Powder | 7 |

We claim:

1. A powdery impact modifier composition, comprising:
   (a) a first population of core/shell polymer particles, and
   (b) a second population of core/shell polymer particles,
   wherein the mean particle diameter of the first population of core/shell polymer particles is at least 50 percent larger than the mean particle diameter of the second population of core/shell polymer particles, and
   wherein the total rubbery weight fraction of the first and second populations of core/shell polymer particles is greater than 90 weight percent.

2. A powdery impact modifier composition as recited in claim 1, further comprising a flow aid.

3. A powdery impact modifier composition as recited in claim 1, wherein the first population of core/shell polymer particles has a mean particle diameter in the range of from 10 nm to 5,000 nm.

4. A powdery impact modifier composition as recited in claim 1, wherein the total rubbery weight fraction of the first and second populations of core/shell polymer particles is less than 100 percent.

5. A powdery impact modifier composition as recited in claim 2, wherein the amount of the flow aid is at least 1.5 weight percent based on the total weight of the powdery impact modifier composition.

6. A spray-driable polymer particle dispersion, comprising:
   (a) water, and
   (b) core/shell polymer particles, the core/shell polymer particles comprising:
      (i) a first population of core/shell polymer particles, and
      (ii) a second population of core/shell polymer particles,
      wherein the mean particle diameter of the first population of core/shell polymer particles is at least 50 percent larger than the mean particle diameter of the second population of core/shell polymer particles, and
      wherein the total rubbery weight fraction of the first and second populations of core/shell polymer particles is greater than 90 weight percent.

7. A spray-driable plastics additive polymer particle dispersion as recited in claim 6, wherein the core/shell polymer particles are present in an amount of more than 40 weight percent, said weight percentage being based on the total weight of the polymer particle dispersion.

8. A spray-driable plastics additive polymer particle dispersion as recited in claim 6, wherein the dispersion has a viscosity of less than 2,000 centipoise.

9. A spray-driable plastics additive polymer particle dispersion as recited in claim 6 further comprising a third population of core/shell polymer particles.

10. A polymeric composition, comprising:
    (a) a matrix resin component, and
    (b) an impact modifier, the impact modifier comprising,
       (i) a first population of core/shell polymer particles, and
       (ii) a second population of core/shell polymer particles,
       wherein the mean particle diameter of the first population of core/shell polymer particles is at least 50 percent larger than the mean particle diameter of the second population of core/shell polymer particles, and
       wherein the total rubbery weight fraction of the first and second populations of core/shell polymer particles is greater than 90 weight percent.

11. The composition or dispersion of any of claims 1 to 9, wherein the total rubbery weight fraction of the first and second populations of core/shell polymer particles is 92 to 98 weight percent.

12. The composition or dispersion of any of claims 1 to 9, wherein the mean particle diameter of the first population of core/shell polymer particles is 100 to 1,000 percent larger than the mean particle diameter of the second population of core/shell polymer particles.

13. The composition or dispersion of any of claims 1 to 9, wherein the mean particle diameter of the first population of core/shell polymer particles is 200 to 300 percent larger than the mean particle diameter of the second population of core/shell polymer particles.

14. The composition or dispersion of any of claims 1 to 9, wherein the mean particle diameter of the first population of core/shell polymer particles is 700 to 1,000 percent larger than the mean particle diameter of the second population of core/shell polymer particles.

15. The composition or dispersion of any of claims 1 to 9, wherein the mean particle diameter of the first population of core/shell polymer particles is 300 to 600 nm and the mean particle diameter of the second population is 100 to 150 nm.

16. The composition or dispersion of any of claims 1 to 9, wherein the mean particle diameter of the first population of core/shell polymer particles is 225 to 275 nm and the mean particle diameter of the second population is 300 to 350 nm or 500 to 600 nm.

17. The composition or dispersion of any of claims 1 to 9, wherein the rubber component is formed from a monomer composition comprising butyl acrylate and the shell is formed from a monomer composition comprising methyl methacrylate.

* * * * *